United States Patent Office 3,741,776
Patented June 26, 1973

3,741,776
PROCESS FOR PREPARING FOODS AND DRINKS
Masakazu Mitsuhashi, Okayama, Mamoru Hirao, Akaiwa-gun, and Kaname Sugimoto, Okayama, Japan, assignors to Hayashibara Company, Okayama, Japan
No Drawing. Filed Jan. 8, 1969, Ser. No. 789,935
Claims priority, application Japan, Jan. 23, 1968, 43/3,863
Int. Cl. A23l 1/26
U.S. Cl. 99—141 R
4 Claims

ABSTRACT OF THE DISCLOSURE

Maltitol is used as the major or sole sweetener of low or non-calorie foods. It serves the functions of providing solids volume, increased viscosity, body, luster, moisture retention and stability to the food without the necessity of sugary or starchy fillers.

---

This invention relates to a process for preparing foods and drinks of intensified sweetness with no increases in the caloric values.

For added sweetness of foods and drinks, it has been customary to use sugars and sugar alcohols, such as cane sugar, grape sugar, fruit sugar, starch syrup, honey and sorbitol, and artificial sweetening agents such as saccharin and cyclohexyl-sodium sulfamate. These sugars and sugar alcohols are invariably crystallizable and easily form crystals in the food products under the influence of temperature or at high concentrations. The artificial sweetening materials have rather poor solubility and provide too high degrees of sweetness to attain the purpose of increasing the solid volume of foods and drinks as by the natural sweetenings. These properties of the common sweetening materials offer inconveniences in use and limit their applications. A further disadvantage is that, not to mention the sugars, the sugar alcohols are absorbed and digested by the human body and, for that reason, cannot be used in the preparation of foods and drinks of low- or non-caloric value, or dietetic or fat-reducing diets required by diabetics and stout persons.

The present invention is directed to the elimination of the foregoing disadvantages, and has for an object to provide foods and drinks having necessary sweetness by adding maltitol to food materials thereby providing a degree of sweetness that is higher than that of grape sugar but slightly less than that of cane sugar, and which may be mixed with other artificial sweetenings such as saccharin and hence can provide freely adjustable sweetness.

Another object of the invention is to provide foods and drinks such as sponge cakes, sweet jelly of beans and concentrated juices having high degrees of sweetness which are protected against crystallization of, or whitening by, the sweetening source by adding maltitol as a sweetening source which has no possibility of crystallization even if used at high concentrations.

Still another object of the invention is to provide foods and drinks of low or no energy value per unit of weight suitable as dietetic or fat-reducing diets for diabetics and corpulent persons by adding maltitol in the preparation of the food products as a sweetening source which is never digested or absorbed by the human body.

Yet another object of the invention is to provide foods and drinks which stimulate the appetite by adding to the food materials maltitol as a sweetening source which enables the food products to retain or absorb moisture to an adequate level and have increased viscosity to possess the same substance, body and luster as those of sugary foods, and which permits the flavorings and colorants used to be maintained in stabilized state.

A further object of the persent invention is to provide foods and drinks containing maltitol as a sweetening source which is extremely stabilized against heat and is capable of imparting sweetness to food products prepared by the application of heat, such as baked cakes, without any possibility of decomposition and coloration of the sweetening source by heat.

Thus, the present invention concerns a process for preparing foods and drinks characterized by the use of maltitol as a sweetening agent therefor which is noncrystallizable, highly soluble, capable of retaining moisture, can confer stability on flavorings and colorants, and has no food value per se.

Maltitol which is used in the practice of the invention is obtained by hdrogenation of pure maltose, in the form of a non-reducing substance as represented by the following formula:

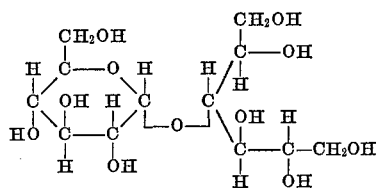

The process for producing maltitol is exemplified as follows. Pure maltose is dissolved in water to prepare a 50% aqueous solution. To the resulting solution is added 8% Raney nickel as a reduction catalyst. The mixture is gradually increased in temperature up to 90°–125° C. with constant stirring. By introducing hydrogen at a pressure of 20–100 kg./cm.[2] the mixture is caused to absorb the hydrogen. After cooling, the reaction mixture is freed of the Raney nickel and is purified in the usual manner by the use of active carbon and ion exchange resin. The product upon concentration yields maltitol in a colorless, transparent and viscous state.

Investigations on the adaptability of this maltitol for use as an additive to foods and drinks have led to the following findings:

(1) Sweetness

A panel test on sweet taste showed that the sweetness of this substance is round and moderate. It goes off quickly and leaves no thick after taste.

It is sweeter than grape sugar but is less sweet than cane sugar, with sweetness apparently about 75 percent that of the latter.

The panel test, participated in by 30 examiners, gave results as below:

(A) Significant difference

The significant difference was determined by a paired preference test on the following basis:

(1) Equation $$x^2 = \frac{[(\alpha_1 - \alpha_2) - 0.5]}{N}$$

where $x^2$: Individual panel result
$\alpha_1$: Number of right answers
$\alpha_2$: Number of wrong answers
$N$: $\alpha_1 + \alpha_2$ (2) Table of $x_2$'s (No. of deg. of freedom=1)

| Level of significance (percent): | $x^2$ |
|---|---|
| 20 | 1.642 |
| 10 | 2.706 |
| 5 | 3.841 |
| 1 | 6.635 |
| 0.1 | 10.827 |

(3) Considering the significant difference with level of significance at 5% or 1%, then it was found:

$x^2 > 6.635$: 1%, Yes
$6.63 > x^2 > 3.84$: 5%, Yes
$x^2 > 3.84$: No (B) Test results (1) Sweetness tests on D-glucose, D-fructose, sucrose and maltitol.

The above test was repeated at least five times for each of the test sweetenings.

| Concentration | Sugars as compared with maltitol | | |
|---|---|---|---|
| | D-fructose | D-glucose | Sucrose |
| Percent: | | | |
| 70 | 42.78 | 6.02 | 28.46 |
| 35 | 17.86 | 3.13 | 15.86 |
| 20 | 28.14 | 1.59 | 12.57 |
| 10 | 20.16 | 0.083 | 8.37 |

From the results tabled above, the sweetening materials may be ranked by order of sweetness as D-fructose > sucrose > maltitol > D-glucose (2) Sweetness of maltitol as compared with that of sucrose:

To eliminate the factor of viscosity, maltitol was dissolved in water to prepare a 35% aqueous solution and the solution was compared with aqueous solutions of sucrose at different concentrations. The results were as tabled below:

Sucrose concentration (percent):      $x^2$
5 —————————————————— 21.01
10 —————————————————— 21.01
15 —————————————————— 21.01
18 —————————————————— 17.28
20 —————————————————— 8.63
25 —————————————————— 3.67
30 —————————————————— 2.83

From the results it appears that a 35% aqueous solution of maltitol is as sweet as a 25% aqueous solution of sucrose.

(2) Non-crystallinity

Maltitol is 100% soluble freely in water. Even a highly concentrated aqueous solution containing 80% maltitol, for example, will not form crystals but occurs in the form of a viscous liquid.

In addition, maltitol is useful in preventing crystallization of other sugars. For example, sucrose or dextrose mixed with maltitol will not crystallize.

(3) Non-caloric value

Experiments revealed that, whereas maltose is readily decomposed by various enzymes, maltitol remains almost unaffected, losing only a few percent. The degrees of decomposition of maltitol as compared with those of maltose were determined using a saccharogenic amylase obtained from a strain of the genera Rhizopus, an enzyme extracted from the pancreas of a hog, and an enzyme obtained by salting out an autolyzed yeast extract solution. The particulars of the experiments were as follows:

(1) Enzymes used and their activities:

(A) Rhizopus saccharogenic amylase (prepd. by Amano Seiyaku Co.):
(1) MA: 8 μ/ml. (SA: 120 μ/ml.)
(2) MA: 0.8 μ/ml. (SA: 12 μ/ml.)
(B) Enzyme extracted from hog pancreas: MA: 0.17 μ/ml.
(C) Salted out enzyme of autolyzed yeast extract solution: MA: 0.07 μ/ml.

(2) Conditions for enzymatic actions:

(A) Composition of reactant solution for the Rhizopus saccharogenic amylase:

Ml.
1% maltitol or maltose solution —————— 5
M/10, pH 5.0 acetic acid buffer solution ———— 4
Enzymatic solution ——————————————— 1

Reaction temperature—40° C.

(B) Composition of reactant solution for the hog pancreas extract enzyme:

Ml.
1% maltitol or maltose solution —————— 5
M/10, pH 7.5 phosphoric acid buffer solution ——— 4
Enzymatic solution ——————————————— 1

Reaction temperature—40° C.

(C) Composition of reactant solution for the salted out enzyme of autolyzed yeast extract solution:

Ml.
1% maltitol or maltose solution —————— 5
M/10, pH 6.5 acetic acid buffer solution ———— 4
Enzymatic solution ——————————————— 1

Reaction temperature—35° C.

(3) Determination of the rates of composition:

The reducing power of each reactant solution with time was determined in terms of glucose by the Lehmann-Shawl method and the values thus obtained were regarded as the values of direct saccharification with time. Aside from this, one milliliter of a 25% hydrochloric acid solution was added to each reactant solution, and the mixture was determined in terms of glucose by the Lehmann-one hour, and then the reducing power was again determined in the same manner as above. The values were regarded as those of total saccharification.

$$\text{Decomposition rate} = \frac{\text{Direct saccharification value with time} - \text{Direct saccharification value in zero hour}}{\text{Total saccharification value} - \text{Direct saccharification value in zero hour}} \times 100 \ (\%)$$

(4) Results:

A. Decomposition by Rhizopus saccharogenic amylase:

| | MA: 8μ/ml. enzyme solution | | MA: 0.8 μml. enzyme solution | |
|---|---|---|---|---|
| | Decomposition rate of— | | | |
| | Maltitol (percent) | Maltose (percent) | Maltitol (percent) | Maltose (percent) |
| Reaction time: | | | | |
| 15 minutes | | 93.5 | | 24.2 |
| 30 minutes | 5.1 | 96.8 | | 48.2 |
| 1 hour | 5.6 | 96.8 | 1.4 | 58.3 |
| 3 hours | 6.0 | 97.6 | 1.9 | 91.4 |
| 5 hours | 6.0 | 100.0 | 2.3 | 99.4 |

B. Decomposition by hog pancreas extract enzyme:

| Reaction time (hours) | Decomposition rate of— | |
|---|---|---|
| | Maltitol (percent) | Maltose (percent) |
| 1 | | 16.7 |
| 2 | 6.7 | 27.4 |
| 20 | 8.5 | 82.1 |
| 45 | 9.05 | 94.0 |
| 120 | 9.96 | 98.5 |

C. Decomposition by salted out enzyme of autolyzed yeast solution

| Reaction time (hours) | Decomposition rate of— | |
|---|---|---|
| | Maltitol (percent) | Maltose (percent) |
| 1 | 0.9 | 12.8 |
| 2 | 1.7 | 24.7 |
| 3 | 3.8 | 32.0 |
| 4 | 5.5 | 39.8 |
| 5 | 8.5 | 45.1 |
| 7 | 12.4 | 67.0 |

Maltitol has no caloric value because it is not digested or absorbed by digestive organs of higher animals. This was demonstrated by experiments with live rabbits. The intestines of test rabbits not fed for 24 hours beforehand were closed at both ends and were injected with 50 cc. of a 20% aqueous soltuion of maltitol or an equilmolecular amount of a sucrose solution each. After the lapse of several hours, the sugar or sugar alcohol left in the intestines was estimated. It was then found that, while 90 percent of the sucrose intake had been lost due to absorption and digestion, maltitol had shown no loss, thus proving its impossibility of being absorbed and digested in the digestive organs. It was also found that maltitol has no harmful stimulus because the intestinal walls exposed to it showed no irregularity such as congestion.

Recent reports have disclosed that xylose and sorbitol, both known as non-caloric sweetening materials, are actually metabolized and cannot be as non-caloric as maltitol.

Thus, maltitol has no energy value as food and, in addition, can improve the palatability of foods with sweetness and body. For these reasons it is esesntial for the preparation of non-caloric drinks and edibles.

(4) Moisture retention and viscosity:
The remarkable moisture-retaining property and viscosity of maltitol are naturally expected from its chemical structure. With the features the additive can also serve as a stabilizer for flavorings, colorants, etc.

Maltitol is highly viscous, as exemplified by the viscosity values of a 70% solution of it at different temperatures as follows:

| At, ° C. | Cps. |
|---|---|
| 22 | 274 |
| 30 | 167 |
| 40 | 94.5 |
| 50 | 60 |
| 59 | 40.3 |

(5) Thermal stability:
Maltitol is highly stabilized against heat. When heated with direct fire, it undergoes no coloration at all up to 200° C. and is colored only slightly above 200° C. Also it will not solidify fast on cooling.

As described hereinabove, maltitol has adequately beneficial properties as a source of sweetness to foods and drinks and, moreover, it obviously has dietetic advantages because of the lack of caloric value. Maltitol is therefore useful for preparation of various soft drinks, including aerated waters such as "Colas" and "Ciders," lactic acid drinks such as "Calpis," and artificial fruit juices, especially concentrated ones. Substitution of maltitol for starch sirup, dextrose or sucrose in ordinary sweet drinks causes replacement of the total amount of carbohydrates in the solid contents of the drinks by the low-calorie substance. This is not only valuable from medical and dietetic viewpoints but is desirable for improving the palatability, imparting suitable viscosity and maintaining flavors of the drinks. By virtue of the additive the drinks can retain their delicious flavors, suit to all palates, and leave no unpleasant after taste behind.

Similarly, maltitol used in sponge cakes and candies, Western or Japanese, gives non-sugar cakes and candies with minimized caloric values. In addition, it causes no danger of drying or crystallization as is often the case with sucrose, and thus it fully displays its advantageous properties of moisture retention and non-crystallization. Biscuits and other baked candies sweetened with maltitol can be served as non-sugar, low-calorie diets. Moreover, the good thermal stability of maltitol avoids excessive coloration of the candies with heat, and protects the candies from cracking and deformation due to cooling after the baking. It is also helpful in improving the yields, preventing loss of the taste and maintaining the food quality for lengthy periods of time. When used in the preparation of jellies and the like, maltitol as a non-caloric ingredient can again prove valuable, for example, in avoiding undesired coloration and fading of edible dyes, in imparting a moisture-retaining property, in maintaining the flavor, and in ensuring long shelf life.

The present invention is illustrated by the following non-limitative examples.

Example 1.—Preparation of a carbonated drink

A carbonated cider-like refreshing drink is prepared in accordance with the following recipe for 18 liters.

| | G. |
|---|---|
| Maltitol (as an anhydride) | 1,500 |
| Cyclamate | 70 |
| Sodium saccharin | 16 |
| Sodium chloride | 5 |
| Citric acid | 110 |
| Flavoring, 100 cc. | |

The mixture of the above composition upon carbonation by the usual method gives a plain and sweet refreshing solution. Maltitol used as the sweetening source gives body, harmonizes well with the sourness of the preparation, improves the after taste, and permits the flavor to be uniformly distributed throughout. Further, this sweetening which has no food value itself makes it possible to provide an ideal non-caloric drink for dietetic purpose. Other refreshing drinks such as Colas can be made in the same way.

Since maltitol is quite compatible with other artificial sweetenings and sugars, the intensity of its sweetness may be adjusted by the use of such other artificial agents to attain best palatability.

Example 2.—Preparation of concentrated sirup

A recipe for preparing 100 liters of a concentrated sirup containing orange juice in accordance with the invention is as tabled below.

| | L. |
|---|---|
| Concentrated (⅕) orange juice | 7.90 |
| 60% maltitol solution | 74.56 |
| 50% citric acid solution | 1.97 |
| Orange base | 0.50 |
| Orange essence | 0.25 |
| Water | 14.80 |

Maltitol is particularly harmonizable with orange juice to give good sweetness and body. In addition, the overall concentration can be much increased by a remarkable reduction of the proportion of water because, unlike sugar, maltitol will not crystallize at high concentrations.

Example 3.—Preparation of "Youkan"
(sweet jelly of beans)

Mashed beans and maltitol in substantially equal amounts are mixed up and a suitable amount of agar is added. The whole mixture is kneaded up with heat in the usual manner to a water content of about 26 percent. The paste thus obtained is shaped as by molding and packed.

Due to the high thermal resistance, maltitol will not be baked in the course of the kneading with heat, but will keep the mixture in the tint desired. It does not crystallize and provides a jelly with such fine luster and taste that stimulate the appetite.

"Youkan" made in this way is a low-calorie food because its caloric value is about one-third the values of conventional products.

Example 4.—Preparation of Western cake

A typical formulation for the preparation of a sponge cake in accordance with the invention is as given below.

| | G. |
|---|---|
| Maltitol (as an anhydride) | 2,000 |
| Egg | 2,250 |
| Flour | 1,000 |
| Honey | 100 |

These ingredients are mixed in the usual manner to form a dough. Next, the dough is spread over a sheet of paper laid on an iron plate, and is baked in an oven. No scorching will occur during the course of baking, and the product is rendered soft and maintains suitable moisture. A sponge cake is thus obtained which has an adequate body and flavor and is resistant to ageing. The cake undergoes no appreciable change for about 10 days after the making. With a carbohydrate content about half those of ordinary products, the cake is a low-calorie food.

Example 5.—Preparation of canned food

In the case of canned oranges, the fruit is packed in cans in the usual manner and the cans are filled with a treacly solution according to the invention. To 50 kg. of maltitol (in anhydrous state) are added 100 g. of sodium cyclamate and 20 g. of saccharin. With the addition of water, a total of 100 kg. of a treacly solution is obtained.

This solution has suitable viscosity and is harmonious with sourness. It retains the flavor of the fruit and is non-caloric per se.

Example 6.—Preparation of bottled marrons in sirup

Chestnuts with the astringent skin peeled off are allowed to stand overnight in water. Then, with the addition of 0.1 to 0.3% alum, the nuts in water are boiled to stiffen the meat and keep the shape. After the removal of water, the nuts are immersed in a 50% maltitol solution, heated at 80° C. for 10 minutes, and then are left as they are. On the following day, 0.1% of sodium cyclamate and 0.03% of saccharin, both on the basis of the amount of a 70% aqueous solution of maltitol, are added to the latter solution. The mixture is diluted to a solution in which the maltitol content is between 50 and 65 percent. Together with 110 g. of the sirup thus obtained, the marrons prepared as above are bottled.

In the manner described the marrons are completely kept from coloration due to reducing sugar and have fine yellowish color. With suitably stiffened meat and beautiful luster, the marrons have pleasant sweetness. Thus, maltitol permits the preparation of marrons soaked in sirup which has heretofore been impossible without the aid of sugar. Further, because the sirup has no food value, the product can serve as a low-calorie food with a coloric value reduced to one half or less those of ordinary ones.

Example 7.—Preparation of artificial "sake"

An exemplary recipe in accordance with the invention is given below:

| | | |
|---|---|---|
| Alcohol (90%) | ltr | 810 |
| Maltitol | kg | 150 |
| Sodium glutamate | g | 600 |
| Succinic acid | g | 3,900 |
| Lactic acid (75%) | g | 770 |
| Potassium hydrogen phosphate | g | 330 |
| Calcium hydrogen phosphate | g | 330 |
| Sodium succinate | g | 650 |
| Sodium chloride | g | 600 |
| Arachone-glycine | g | 350 |
| Fermented liquor for seasoning | ltr | 450 |

With the addition of water to the composition to an overall volume of 5400 l., the whole solution is kept still in a cool place and, after screening, it is aged for one month. The "sake" thus prepared is pasteurized at 50° C. and bottled.

This synthesized "sake" has the extract content and consistency demanded of natural, fermented "sake," and has good body. Free from sugar and with nearly no caloric value, the product may well be called a non-calorie artificial "sake." It features stable body and flavor and well balanced taste.

Example 8.—Preparation of white wine

After removal of their skins and stones, grapes are squeezed to yield juice. Potassium pyrosulfite is added to the juice to inhibit the growth of infectious microbes and seed mash is added for fermentation purpose. Upon completion of the fermentation, suitable proportions of maltitol and alcohol are incorporated. The whole solution is then casked and fermented. Subsequently it is stored and bottled in the usual manner.

The following is a typical recipe for the preparation of white wine in accordance with the invention.

| | | |
|---|---|---|
| Grape juice | ltr | 170 |
| Potassium pyrosulfite | g | 40 |
| Seed mash | ltr | 7 |
| Alcohol (80%) | ltr | 10 |
| Maltitol | kg | 5 |

White wine thus produced has practically the same alcohol content, extract content and acidity as those of conventional white wines but contains little sugar. The mild sweetness of maltitol and the flavor of wine are well balanced by ageing and the product can remain palatable for long periods. The product has the suitable sweetness of ordinary white wine, and is finely colored like the best of white wines, and yet has almost no energy values. With these features, the wine is a most suitable non-calorie dietetic drink for diabetes and obesity.

Example 9.—Preparation of sweetened condensed milk

Raw milk whose fat content has been adjusted beforehand is subjected to flash pasteurization at 110° to 130° C. The milk is then boiled for a short time and, after the addition of maltitol in an amount equivalent to 15 percent of the amount of raw milk, the milk is condensed. By means of a cooler, the milk is cooled to a temperature below 15° C. and is treated so as to pulverize the lactose to finer crystals.

An exemplary composition of the milk is as follows:

| | Percent |
|---|---|
| Water content | 26 |
| Solid matters of whole milk | 29 |
|     Fat | 8 |
|     Protein | 7 |
|     Lactose | 12 |
|     Ash content | 1.5 |
| Maltitol | 45 |

This condensed milk has fine creamy luster and suitable viscosity. Since the fat content is thoroughly dispersed and the crystallization of lactose is avoided, the milk is pleasant to the palate. It is a low-calorie food with an extremely low caloric value, less than one sixth the values of conventional condensed milks.

We claim:

1. A low caloric food or drink containing an agent for adding solid volume, body, moisture absorbance, luster and increased viscosity and a low caloric sweetening agent wherein both said agents consist essentially of pure maltitol in an amount sufficient to provide the desired solid volume, body, moisture absorbance, luster and increased viscosity and the desired degree of sweetness.

2. A highly concentrated orange juice sirup consisting essentially of about 8% of ⅕ concentrated orange juice, 75% of a 60% solution of pure maltitol, 2% of a 50% citric acid solution and 15% water.

3. A low-calorie carbonated soft drink containing a body producing agent and a low calorie sweetening agent wherein both said agents consist essentially of pure maltitol in an amount sufficient to provide the desired body and the desired degree of sweetness.

4. A low-caloric sweetened condensed milk containing pure maltitol as a low caloric sweetening agent and a viscosity increasing agent, said condensed milk consisting essentially of about 26% water, 29% milk solids and 45% maltitol.

References Cited

UNITED STATES PATENTS

| | | | |
|---|---|---|---|
| 2,311,235 | 7/1941 | Kuderman | 99—141 |
| 2,917,390 | 12/1959 | Apel et al. | 99—142 |
| 2,868,847 | 1/1959 | Boyers | 260—635 |
| 3,492,131 | 1/1970 | Schlatter | 99—141 |

FOREIGN PATENTS

| | | |
|---|---|---|
| 1,062,283 | 3/1967 | Great Britain. |

OTHER REFERENCES

Rose, Condensed Chemical Dictionary, Reinhold Book Corp. 7th edition, 1968, p. 580.

RAYMOND N. JONES, Primary Examiner

R. B. ANDEWELT, Assistant Examiner

U.S. Cl. X.R.

99—105, 54, 28